May 16, 1967  G. B. BOSCO, JR., ET AL  3,320,450
BRUSHLESS ALTERNATOR FOR VEHICLES
Filed May 18, 1964
2 Sheets-Sheet 1
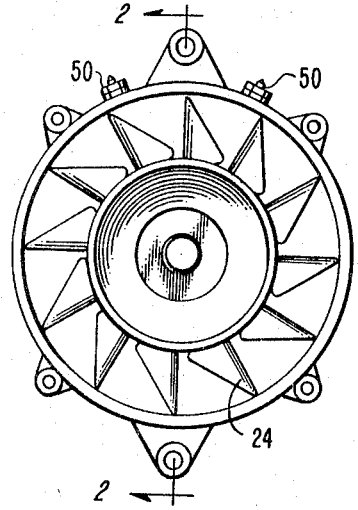
FIG.—1
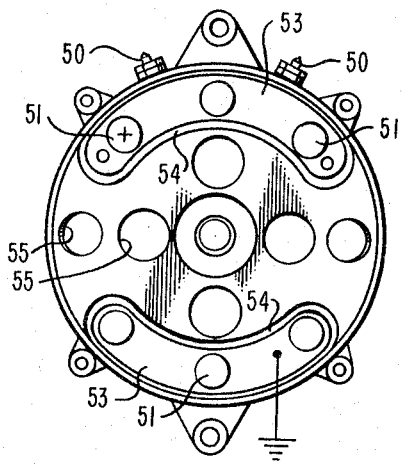
FIG.—5
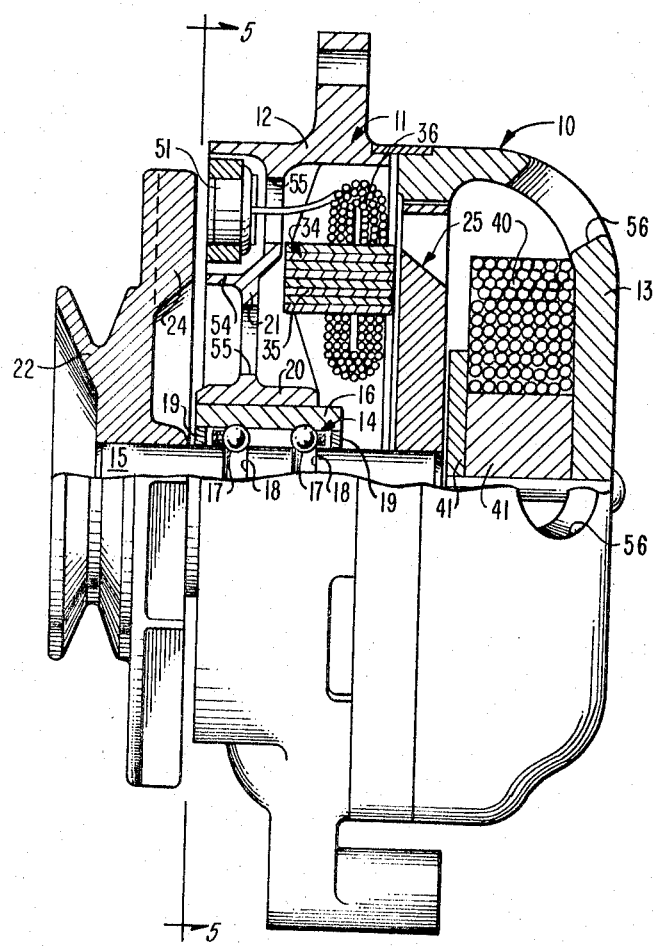
FIG.—2
INVENTORS
HOWARD E. CORBITT
GEORGE B. BOSCO, JR.
BY
Edward O. Ansell
William E. Hiller
ATTORNEYS May 16, 1967  G. B. BOSCO, JR., ET AL  3,320,450
BRUSHLESS ALTERNATOR FOR VEHICLES
Filed May 18, 1964  2 Sheets-Sheet 2

INVENTORS
HOWARD E. CORBITT
GEORGE B. BOSCO, JR.
BY
ATTORNEYS

United States Patent Office 3,320,450
Patented May 16, 1967

3,320,450
BRUSHLESS ALTERNATOR FOR VEHICLES
George B. Bosco, Jr., Whittier, and Howard E. Corbitt, Arcadia, Calif., assignors to Aerojet-General Corporation, Azusa, Calif., a corporation of Ohio
Filed May 18, 1964, Ser. No. 368,171
12 Claims. (Cl. 310—168)

In part, this application discloses and claims subject matter disclosed in our copending U.S. patent application Ser. No. 56,080, filed Aug. 12, 1960, now U.S. Patent 3,261,998, issued July 19, 1966, and is accordingly a continuation-in-part thereof.

This invention generally relates to a dynamoelectric machine of the electromagnetic induction type, and more particularly to an improved brushless alternator of compact construction especially suitable for use in vehicles of general character, such as automobiles, aircraft, boats as a source of electric power, wherein the rotor member of the alternator is fixedly mounted on an end of a shaft which is included as a component of a unitary shaft-bearing assembly such that the end of the shaft with the rotor member thereon is received within the alternator housing and the shaft is supported for rotation within the housing by the bearing structure of the unitary shaft-bearing assembly.

Typically, a dynamoelectric machine, such as an alternator, includes a rotor member mounted on a rotatable shaft for rotation therewith to cooperate with one or more stator members in generating electric power, the shaft being supported for rotation in a housing by a pair of axially spaced bearing assemblies mounted at each end of the housing. Such bearing assemblies are a comparatively expensive item of the total manufacturing cost likely to be involved in producing an alternator for use in an automobile, for example, to provide a source of electric power. In addition, it is necessary to precisely aline the two bearing assemblies which are to support the shaft for rotation within the alternator housing with respect to each other so that the shaft itself will not be misalined—a sometimes tedious and time-consuming operation. Misalinement between the two bearing assemblies may cause shaft "wobble" when the shaft is rotated with consequent malfunction of the dynamoelectric machine.

It is therefore an object of the present invention to provide a dynamoelectric machine having a rotor member fixedly mounted on an end of a shaft which is part of a unitary shaft-bearing assembly with the bearing structure of the unitary shaft-bearing assembly supporting the shaft and the rotor member thereon for rotation within the housing of the dynamoelectric machine. The unitary shaft-bearing assembly affords significant economies in manufacturing costs as compared to the use of standard bearing units, while also eliminating the necessity for any alinement procedure to bring a pair of shaft-supporting bearing assemblies into alinement with each other.

It is also an object of this invention to provide a dynamoelectric machine in the form of a brushless alternator of compact size and high reliability especially suitable for automotive applications as a source of electric power.

Some of the objects of the invention having been stated, other objects will become apparent as the specification proceeds when taken together with the accompanying drawings, in which:

FIG. 1 is an end elevation view of a brushless alternator constructed in accordance with the present invention;

FIG. 2 is an enlarged longitudinal sectional view, partially shown in elevation, taken along the line 2—2 in FIG. 1;

FIG. 5 is a transverse sectional view on a reduced scale taken along the line 5—5 of FIG. 2.

Figure 3:
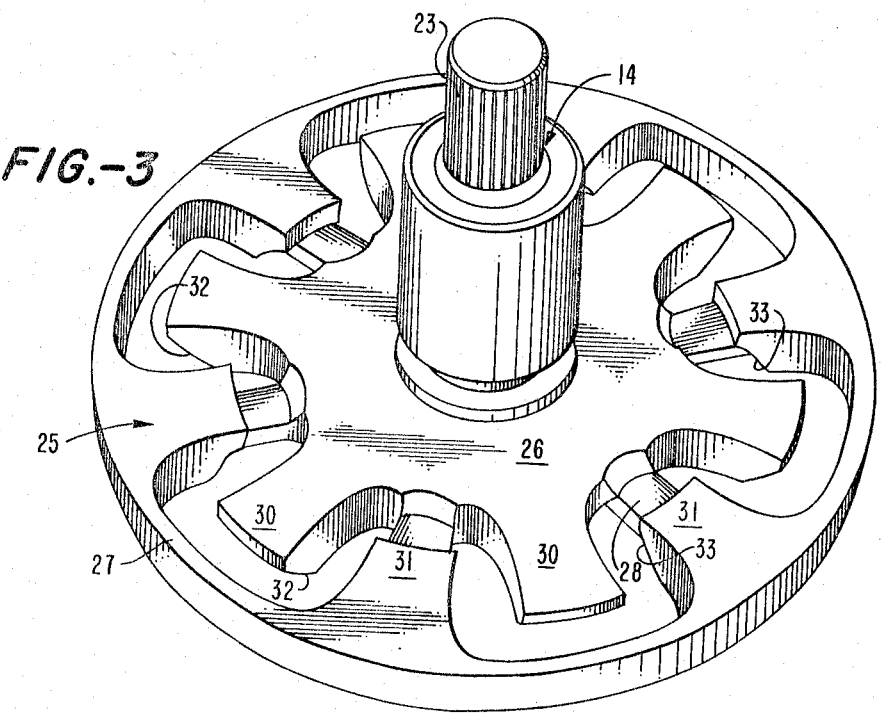
FIG. 3 is an enlarged perspective view of a unitary shaft-bearing assembly having a rotor member fixedly mounted on one end of the shaft which forms part of the alternator shown in FIGS. 1 and 2.
Figure 4:
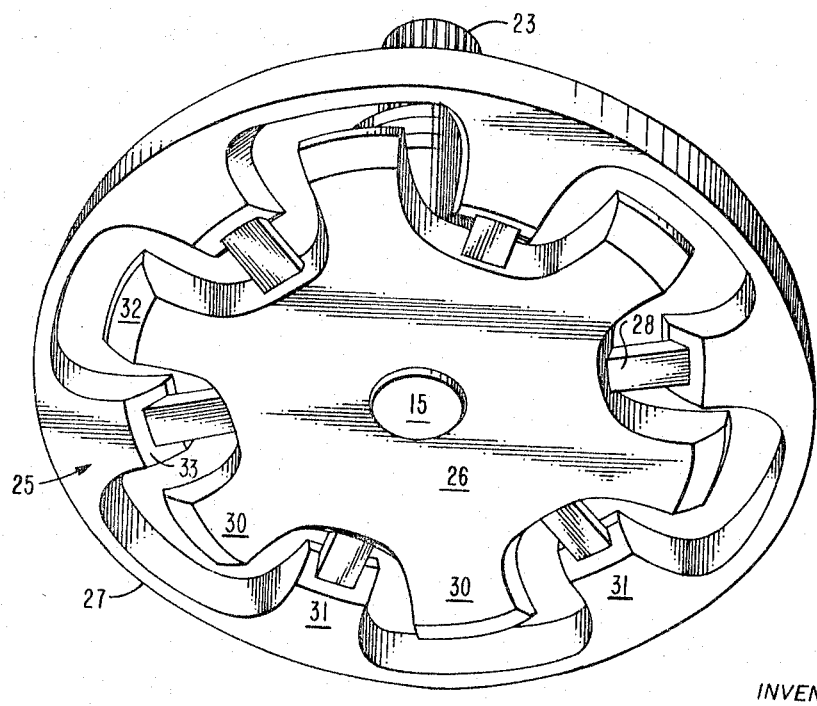
FIG. 4 is an enlarged perspective view similar to FIG. 3, but looking at the unitary shaft-bearing assembly with the rotor member fixedly mounted on the shaft from the end of the shaft on which the rotor member is mounted.

Referring more specifically to the drawings, there is shown a dynamoelectric machine in the form of a brushless alternator which is broadly identified by the reference numeral 10. In accordance with the present invention, the alternator 10 is particularly suitable for use in vehicles, such as automobiles, aircraft, boats, to provide a source of electric power. The alternator 10 comprises a housing 11 which may be formed by a pair of housing sections 12, 13 suitably secured together. For reasons which will appear hereinafter, the housing section 13 is made of magnetic material, while the housing section 12 is made of non-magnetic material.

In accordance with the present invention, a unitary shaft-bearing assembly 14 is received in the housing 11, the cylindrical shaft 15 which forms a part of the unitary shaft-bearing assembly 14 having one end disposed within the housing 11 so as to provide an end portion in radial alinement with the end portion of the magnetic housing section 13 in juxtaposition to the non-magnetic housing section 12. The opposite end of the shaft 15 is disposed outwardly of the housing 11 beyond the non-magnetic housing section 12.

The unitary shaft-bearing assembly 14 further includes an elongate axially extending race in the form of a cylindrical sleeve 16 encircling the shaft 15 in radially outwardly spaced relation thereto. The inner surface of the sleeve 16 is provided with a pair of axially spaced annular grooves. A plurality of anti-friction balls 17 are partially received in each of the annular grooves provided in the inner surface of the sleeve 16. Suitable means are provided to retain the balls 17 for free movement in the grooves in the inner surface of the sleeve 16 at predetermined positions therealong, such as for example, cage members carried by the sleeve 16. The shaft 15 is also provided with a pair of axially spaced annular grooves 18 in respective radial alinement with the grooves in the inner surface of the sleeve 16 such that the balls 17 are partially received within the grooves 18 in the shaft 15 to support the shaft 15 for rotation within the housing 11. Thus, the sleeve 16 acts as an outer race for the anti-friction balls 17, while the shaft 15 serves as the inner race therefor in the unitary shaft-bearing assembly 14. Preferably, the sleeve 16 carries an annular dust shield 19 at each end thereof.

The unitary shaft-bearing assembly 14 affords significant economies in manufacturing costs as compared to a shaft which is supported at each of its ends by a separate anti-friction ball bearing unit having inner and outer races with anti-friction balls between the races. Moreover, the unitary shaft-bearing assembly 14 is not hampered by alinement problems.

The unitary shaft-bearing assembly 14 is mounted within the housing 11, the sleeve 16 being fixedly secured within an annular hub 20 forming the inner end of a generally radial housing wall 21 integral with the housing section 12 and extending inwardly thereof. The sleeve 16 of the unitary shaft-bearing assembly 14 may be fixedly secured within the annular hub 20 by any suitable means, such as a pressed fit.

A sheave or pulley 22 may be fixedly mounted on the end of the shaft 15 disposed outwardly of the housing 11. In this connection, the end of the shaft 15 receiving the sheave 22 may be provided with axially extending splines 23 (FIG. 3) for keying the sheave 22 in fixedly secured relation to the shaft 15. The sheave 22 is adapted to have a belt (not shown) entrained thereabout for being driven to impart rotation to the shaft 15. The belt referred to may be the belt entrained about the water pump shaft and driven by the crankshaft of a vehicle, for example. As shown, the sheave 22 may be provided with a plurality of radially extending blades 24 integrally formed therewith so as to additionally serve as a fan when rotating to enhance the ventilation of the alternator housing 11 as will hereinafter appear. The driven member referred to as the sheave 22 therefore accomplishes a two-fold function—namely, imparting rotation to the shaft 15 and providing a continuous flow of air to ventilate the alternator housing 11.

The rotatable shaft 15 carries a rotor member 25 thereon within the housing 11, the rotor member 25 being fixedly secured to the end portion of the shaft 15 in radial alinement with the end portion of the magnetic housing section 13 juxtaposed to the non-magnetic housing section 12. To this end, the rotor member 25 has a central bore for snugly receiving the end portion of the shaft 15 within the housing 11. The rotor member 25 may be fixedly secured to the shaft 15 by any suitable means, such as a pressed fit. The rotor member 25 is of unitary construction and comprises an inner metallic disc 26, an outer annular metallic rim 27, and spacer means in the form of a plurality of metallic spacer members 28 extending between the disc 26 and the rim 27 to connect the disc 26 and the rim 27 together in radially spaced relationship. The disc 26 is made of a magnetic metal material and is provided with a plurality of circumferentially spaced radially outwardly extending projections 30 which comprise magnetic poles of the same given magnetic polarity. The annular rim 27 is also made of a magnetic metal material and is provided with a plurality of arcuately spaced radially inwardly extending projections 31 which comprise magnetic poles of like magnetic polarity, but opposite from the polarity of the poles 30 on the disc 26. The poles 30 on the disc 26 and the poles 31 on the annular rim 27 alternate in sequence, such that respective poles 31 on the annular rim 27 are interposed between adjacent poles 30 on the disc 26 in arcuately spaced relation thereto, and vice versa.

The spacer members 28 are made of a non-magnetic metal material. Each of the spacer members 28 comprises a flat elongate bar. The radially outwardly disposed end of the bar 28 is received within a complementary recess formed in one of the radially inwardly extending projections or magnetic poles 31 on the annular rim 27 and is suitably fixedly secured, as by welding, for example, to the projection 31 on the annular rim 27. Similarly, the radially inwardly disposed end of the bar 28 is received within a complementary recess formed in the disc 26 at a location thereon between adjacent radially outwardly extending projections or magnetic poles 30 on the disc 26 and is suitably fixedly secured, as by welding, for example, to the disc 26.

Magnetic leakage between the inner poles 30 on the disc 26 and the outer poles 31 on the annular rim 27 of the rotor member 25 is held to a minimum by providing for an effective reduction in the surface areas of poles 30, 31 of unlike magnetic polarity facing each other while increasing the effective distance between such poles 30, 31 of unlike polarity. This may be accomplished by forming the respective ends of the poles as tapered or beveled surfaces with the degree of the tapered or beveled surfaces 32 at the ends of the poles 30 on the disc 26 being oppositely inclined from the degree of the tapered or beveled surfaces 33 at the ends of the poles 31 on the annular rim 27.

A stator member 34 is mounted within the housing 11, the stator member 34 being supported within the non-magnetic housing section 12 by suitable insulated mounting means and being disposed in axially spaced relation to the opposed radial face of the rotor member 25 to define an axial air gap therebetween. The stator member 34 comprises an annular armature or core 35 of magnetic material, such as iron. The stator armature 35 may be formed of strip material, tightly wound to provide spiral convolutions wherein the respective convolutions constitute laminations. The stator armature 35 is provided with a plurality of circumferentially spaced radial slots in the radial face thereof opposed to the rotor member 25, the slots receiving stator windings 36 therein to assist in supporting the windings 36 on the stator armature 35. The windings 36 are arranged and distributed about the stator armature 35 in a predetermined manner depending upon the character of the electromotive force which is desired to be produced by the alternator 10. Various forms of known windings for armatures may be suitably employed.

Means are provided for creating a magnetic field in the housing 11 in the region of the rotor member 25. To this end, a field winding or field coil 40 is wound about a field armature or field iron 41 which is carried by the housing section 13 of magnetic material in opposed relation to the radial face of the rotor member 25 opposite from the stator member 34. The field coil 40 and the field iron 41 are thereby arranged in axially spaced relation to the opposed radial face of the rotor member 25 to define an axial air gap therebetween. Upon exciting the field coil 40 by connecting the field coil 40 to a source of direct current, such as for example an automobile battery (not shown), to electrically energize the field coil 40, a magnetic flux is created. The magnetic flux flows from the field iron 41 across one axial air gap to the inner poles 30 on the disc 26 of the rotor member 25, across the other axial air gap into the stator armature 35, around the annular stator armature 35 and back cross the other axial air gap to the outer poles 31 on the annular rim 27 of the rotor member 25, to the periphery of the annular rim 27 and radially outwardly across a radial air gap between the rotor member 25 and the magnetic housing section 13 to the housing section 13, and inwardly through the housing section 13 to return to the field iron 41 in completing the magnetic circuit.

The rotation of the shaft 15 as driven by the sheave 22 and the corresponding rotation of the rotor member 25 carried by the shaft 15 while the field coil 40 is being excited by the application of direct current thereto, causes an electromotive force in the form of alternating voltage to be generated in the windings 36 on the stator armature 35. In this respect, it will be understood that the rotation of the rotor member 25 causes the groups of poles 30 and 31 of unlike magnetic polarity to be moved across the opposed annular radial face of the stator armature 35 so that the magnetic flux cuts through the windings 36 on the stator armature 35 to generate alternating voltage in the windings 36.

The alternating voltage so generated can then be utilized as a source of electric power by connecting the leads of the stator windings 36 to output terminals 50 located on the exterior of the housing 11.

In accordance with the present invention, rectifiers 51 may be connected to the leads of the stator windings 36, with the output terminals 50 being thereafter electrically connected to the rectifiers 51 so that the alternating voltage generated by the alternator 10 can be converted to direct current so as to be delivered as direct current to provide a source of electric power. The rectifiers 51 are mounted within the non-magnetic housing section 12 and are carried by a plurality of arcuate plates 53 which are respectively secured to the housing section 12. Two such arcuate plates 53 are shown in FIG. 5.

The radial housing wall 21 is provided with a pair of arcuate axially extending flanges 54 having curvilinear end extensions merging with the housing section 12 so as to define a pair of cavities in which the arcuate plates 53 carrying the rectifiers 51 are received. The radial housing wall 21 is further provided with a plurality of openings 55 therethrough which cooperate with a plurality of circumferentially arranged openings 56 formed in the radially outwardly disposed portion of the housing section 13 to provide effective ventilation of the alternator housing 11.

As earlier described, ventilation of the alternator housing 11 effecting cooling of the alternator 10 is enhanced by the fan portion of the sheave 22. In this connection, the blades 24 on the sheave 22 direct a continuous flow of air through the openings 55 in the radial housing wall 21 and the openings 56 in the housing section 13 when the alternator 10 is in operation with the sheave-fan 22 imparting rotation to the shaft 15. The air flow through the alternator housing 11 exerts a cooling influence on the alternator 10 to prevent overheating.

The rotor member 25 may be readily skewed in a well-known manner to reduce the audible noise accompanying the rotation of a rotor member in the operation of a dynamoelectric machine to an unobjectionable level.

The embodiment of the invention which has been described and shown herein is by way of example, but should not be construed as necessarily limitative of the scope of the invention since various modifications may be made by those skilled in the art without departing from the scope of the invention as defined by the appended claims.

What is claimed is:

1. A dynamoelectric machine comprising a housing, a rotatable shaft received in said housing and having one end disposed therewithin, bearing means carried by said housing and surrounding said shaft to support said shaft for rotation with respect to said housing, a rotor member having oppositely disposed radial faces mounted on the end of said shaft within said housing for rotation with said shaft; said rotor member comprising a radially inner magnetic disc fixed to said shaft and having a plurality of circumferentially spaced radially outwardly extending projections, a radially outer annular magnetic rim extending about said inner disc in spaced relation thereto and having a plurality of spaced radially inwardly extending projections respectively received in spaced relationship between adjacent radially outwardly extending projections on said inner disc, a plurality of non-magnetic spacer members extending between said inner disc and said outer rim connecting said inner disc and said outer rim together in radially spaced relationship, said non-magnetic spacer members occupying only a minor portion of the space existing between said inner disc and said outer rim so as to define therewith a unitary rotor member provided with voids therein between said inner disc and said outer rim thereof, said radially outwardly extending projections on said inner disc comprising magnetic poles of one magnetic polarity, and said radially inwardly extending projections on said outer rim comprising magnetic poles of the opposite magnetic polarity; a stator member mounted within said housing and carried thereby in axially spaced opposed relation to said rotor member, said stator member comprising an armature core of magnetic material having stator windings thereon, stationary means of magnetic material forming a closed path for magnetic flux through the magnetic disc and rim of said rotor member and said armature core of said stator member, a field coil magnetically associated with said stationary means, and magnetic flux being created through said closed path in response to energization of said field coil, whereby the rotation of said shaft and said rotor member carried thereby generates an alternating voltage in said stator windings.

2. A dynamoelectric machine as defined in claim 1, wherein said shaft and said bearing means comprise a unitary shaft-bearing assembly.

3. A dynamoelectric machine comprising a housing having a non-magnetic housing section and a magnetic housing section, a rotatable shaft received in said housing and having one end disposed therewithin in said magnetic housing section, bearing means carried by said non-magnetic housing section and surrounding said shaft to support said shaft for rotation with respect to said housing, a rotor member having oppositely disposed radial faces mounted on the end of said shaft within said magnetic housing section for rotation with said shaft and being in radial alinement with a portion of said magnetic housing section; said rotor member comprising a radially inner magnetic disc fixed to said shaft and having a plurality of circumferentially spaced radially outwardly extending projections, a radially outer annular magnetic rim extending about said inner disc in spaced relation thereto and having a plurality of spaced radially inwardly extending projections respectively received in spaced relationship between adjacent radially outwardly extending projections on said inner disc, a plurality of non-magnetic spacer members extending between said inner disc and said outer rim connecting said inner disc and said outer rim together in radially spaced relationship, said non-magnetic spacer members occupying only a minor portion of the space existing between said inner disc and said outer rim so as to define therewith a unitary rotor member provided with voids therein between said inner disc and said outer rim thereof, said radially outwardly extending projections on said inner disc comprising magnetic poles of one magnetic polarity, and said radially inwardly extending projections on said outer rim comprising magnetic poles of the opposite magnetic polarity; a stator member mounted within said non-magnetic housing section and carried thereby in axially spaced opposed relation to said rotor member, said stator member comprising an armature core of magnetic material having stator windings thereon, stationary means of magnetic material cooperating with said magnetic housing section to form a closed path for magnetic flux through the magnetic disc and rim of said rotor member and said armature core of said stator member, a field coil magnetically associated with said stationary means, and magnetic flux being created through said closed path in response to energization of said field coil, whereby the rotation of said shaft and said rotor member carried thereby generates an alternating voltage in said stator windings.

4. A dynamoelectric machine as defined in claim 3, wherein said shaft and said bearing means comprise a unitary shaft-bearing assembly.

5. A dynamoelectric machine comprising a housing, a rotatable shaft received in said housing, a rotor member mounted on said shaft within said housing for rotation with said shaft; said rotor member comprising a radially inner magnetic disc fixed to said shaft and having a plurality of circumferentially spaced radially outwardly extending projections, a radially outer annular magnetic rim extending about said inner disc in spaced relation thereto and having a plurality of spaced radially inwardly extending projections respectively received in spaced relationship between adjacent radially outwardly extending projections on said inner disc, a plurality of non-magnetic spacer members extending between said inner disc and said outer rim connecting said inner disc and said outer rim together in radially spaced relationship, said non-magnetic spacer members occupying only a minor portion of the space existing between said inner disc and said outer rim so as to define therewith a unitary rotor member provided with voids therein between said inner disc and said outer rim thereof, said radially outwardly extending projections on said inner disc comprising magnetic poles of one magnetic polarity, and said radially inwardly extending projections on said outer rim comprising magnetic poles of the opposite magnetic polarity; a stator member mounted within said housing and carried thereby in axially spaced opposed relation to said rotor member, said stator member comprising an armature core of magnetic material having stator windings thereon, stationary means of magnetic material forming a closed path for magnetic flux through the magnetic disc and rim of said rotor member and said armature core of said stator member, a field coil magnetically associated with said stationary means, and magnetic flux being created through asid closed path in response to energization of said field coil, whereby the rotation of said shaft and said rotor member carried thereby generates an alternating voltage in said stator windings.

6. A dynamoelectric machine as defined in claim 5, wherein said stationary means of magnetic material comprises a field armature mounted within said housing in axially spaced opposed relation to said rotor member on the side thereof opposite from said stator member, and said field coil being affixed within said housing and extending about said field armature.

7. A dynamoelectric machine as defined in claim 6, wherein said magnetic poles of said rotor member are provided with beveled end surfaces at their terminal ends, and the degree of incline of the beveled end surfaces of the magnetic poles on said inner disc being reversed from the degree of incline of the beveled end surfaces of the magnetic poles on said outer rim.

8. A rotor member for use in a dynamoelectric machine comprising a magnetic disc having a plurality of circumferentially spaced radially outwardly extending projections, an annular magnetic rim extending about said disc in radially spaced relation thereto and having a plurality of spaced radially inwardly extending projections respectively received in spaced relationship between adjacent radially outwardly extending projections on said disc, a plurality of non-magnetic spacer members extending between said disc and said rim connecting said disc and said rim together in radially spaced relationship, said non-magnetic spacer members occupying only a minor portion of the space existing between said disc and said rim so as to define therewith a unitary construction for the rotor member provided with voids therein between said disc and said rim thereof, said radially outwardly extending projections on said disc comprising magnetic poles of one magnetic polarity, and said radially inwardly extending projections on said rim comprising magnetic poles of the opposite magnetic polarity.

9. A rotor member as defined in claim 8, wherein said disc and said rim cooperatively define oppositely disposed radial faces interrupted by the voids between said disc and said rim.

10. A rotor member as defined in claim 9, wherein said magnetic poles on said disc and said rim are provided with beveled end surfaces at their terminal ends, and the degree of incline of the beveled end surfaces of the magnetic poles on said disc being reversed from the degree of incline of the beveled end surfaces of the magnetic poles on said rim.

11. In a dynamoelectric machine having a housing, a rotatable shaft received in said housing and having one end thereof disposed in said housing, bearing means carried by said housing and surrounding said shaft to support said shaft for rotation with respect to said housing, a rotor member having oppositely disposed radial faces containing magnetic material mounted on the end of said shaft disposed in said housing for rotation with said shaft, a stator member mounted within said housing and carried thereby in axially spaced opposed relation to one of the magnetic material-containing radial faces of said rotor member and comprising an armature core of magnetic material having stator windings thereon, stationary means of magnetic material forming a closed path for magnetic flux through the magnetic material-containing radial faces of said rotor member and said armature core of said stator member, and a field coil magnetically associated with said stationary means, such that energization of said field coil produces magnetic flux through said closed path which cuts through said stator windings upon rotation of said rotor member imparted by rotation of said shaft to generate an alternating voltage in said stator windings; the improvement wherein said bearing means cooperates with said shaft to define a unitary shaft-bearing assembly, said shaft-bearing assembly including a sleeve coupled to said shaft in radially outwardly disposed surrounding relation thereto, and said sleeve being fixedly mounted within said housing and carried by said housing so that said unitary shaft-bearing assembly is supported within said housing with said shaft being rotatable with respect to said sleeve.

12. In a dynamoelectric machine having a housing, a rotatable shaft received in said housing and having one end thereof disposed in said housing, bearing means carried by said housing and surrounding said shaft to support said shaft for rotation with respect to said housing, a rotor member having oppositely disposed radial faces containing magnetic material mounted on the end of said shaft disposed in said housing for rotation with said shaft, a stator member mounted within said housing and carried thereby in axially spaced opposed relation to one of the magnetic material-containing radial faces of said rotor member and comprising an armature core of magnetic material having stator windings thereon, stationary means of magnetic material forming a closed path for magnetic flux through the magnetic material-containing radial faces of said rotor member and said armature core of said stator member, and a field coil magnetically associated with said stationary means, such that energization of said field coil produces magnetic flux through said closed path which cuts through said stator windings upon rotation of said rotor member imparted by rotation of said shaft to generate an alternating voltage in said stator windings; the improvement wherein said bearing means cooperates with said shaft to define a unitary shaft-bearing assembly, said shaft-bearing assembly comprising a sleeve coupled to said shaft in radially outwardly spaced and surrounding relation thereto, said sleeve having a pair of axially spaced annular grooves formed in its inner surface, said shaft being provided with a pair of axially spaced annular grooves in radial alignment with the grooves in the inner surface of said sleeve, a plurality of balls partially received in each of the grooves in the inner surface of said sleeve and partially received in the grooves in said shaft, and means carried by said sleeve to retain said balls for free movement in the grooves in the inner surface of said sleeve at predetermined positions therealong, and said sleeve being fixedly mounted within said housing and carried by said housing so that said unitary shaft-bearing assembly is supported within said housing with said shaft being rotatable with respect to said sleeve.

References Cited by the Examiner
UNITED STATES PATENTS 2,928,963  3/1960  Bertsche et al. _____ 310—168
3,056,058  9/1962  Henry-Baudot _____ 310—268

MILTON O. HIRSHFIELD, *Primary Examiner.*

L. L. SMITH, *Assistant Examiner.*